A. CLARKE & T. REECE.
CRACKER CRUSHER.
No. 61,163. Patented Jan. 15, 1867.
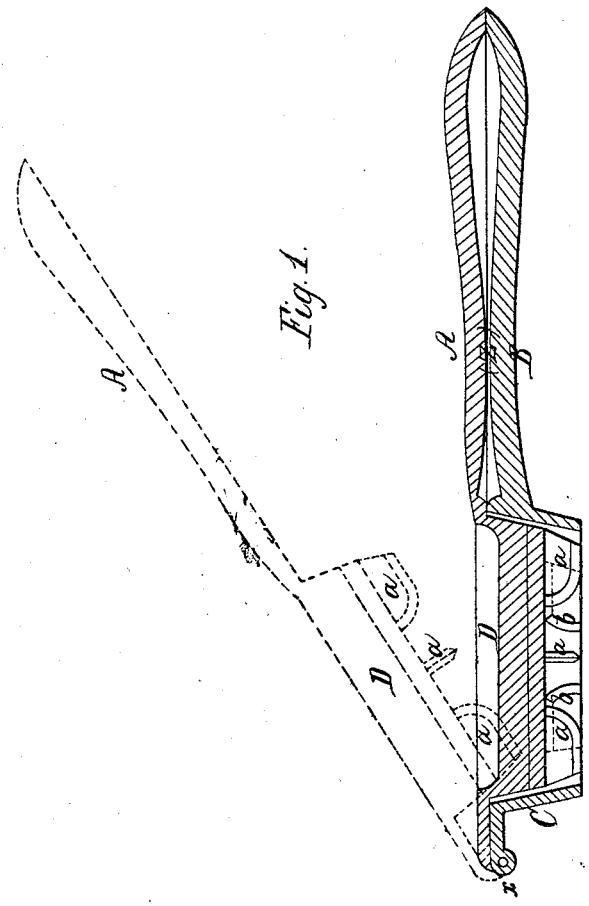
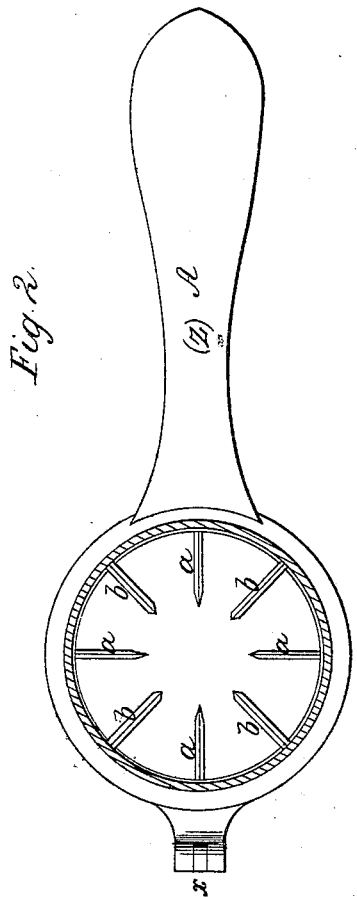

United States Patent Office.

A. CLARKE AND T. REECE, OF PHILADELPHIA, PENNSYLVANIA.

Letters Patent No. 61,163, dated January 15, 1867.

IMPROVED CRACKER CRUSHER.

The Schedule referred to in these Letters Patent and making part of the same.

TO ALL WHOM IT MAY CONCERN:

Be it known that we, ARTHUR CLARKE and THOMAS REECE, of Philadelphia, in the county of Philadelphia, and in the State of Pennsylvania, have invented certain new and useful "Devices for Crushing Crackers;" and do hereby declare that the following is a full, clear, and exact description thereof, reference being had to the accompanying drawings, and to the letters of reference marked thereon, making a part of this specification.

Our invention has for its object the crushing of crackers for hotels, saloons, families, or other places.

In the annexed drawings is shown a form which we use for this purpose, but we do not wish to be understood as confining ourselves to this peculiar or particular form, as we propose varying the same, as will be more fully shown hereafter.

This crusher is constructed of two distinct sections or parts, A B. Section A is the upper section, and is composed of a suitable handle and circular-shaped flange, D, which has four or more wings or cutters, $a$, on its under side. Section B is also composed of a handle, but has a bottomless cup, C, in which is placed the corresponding cutters $b$, and so placed that they fill in the spaces between each of the cutters $a$. It will be seen that the flange D is made so that it snugly fits in the cup C, and when closed the cutters $a$ and $b$ are equidistant, and have the appearance as shown in fig. 2. Sections A and B are both provided with a small ear at the end of the flange and cup $x$, and at which point the sections are hinged together. We may hinge the sections together at or near the centre of their handles, $z$, instead of at the point $x$, and allow the same to be operated similar to a pair of scissors or pliers; but on experimenting, we find that suitable purchase is had with the fulcrum at either of the points $x$ or $z$. We wish to construct the cup C either in a round or other suitable shape, and instead of a bottomless cup make a perforated bottom to allow the cracker crumbs to pass through, or a single opening centrally located in the bottom for the same purpose. In the operation of this invention, the crackers are usually placed within the cup C, (handle A and flange being elevated by means of its hinge, as shewn, fig. 1,) and said cup placed over the vessel or thing upon which the crackers are wanted; the handle A is then brought down, causing the wings $a$ to crush the crackers upon the wings $b$, and the same fall through the cup. The wings $a$ $b$ may be either sharpened or otherwise on their edges, or may merely be ribs, teeth, or any devices substantially the same as those herein referred to.

It will be seen that this invention effectually obviates the necessity of breaking crackers with the hands or teeth, and will easily break and crush the crackers of the hardest as well as the softest kinds, and can be regulated so that they are or can be broken either fine or coarse, according to the number of teeth placed on the flanges and cup. Either of the devices described may be of brass, cast iron, or of any other material preferred.

Having thus fully described our invention, what we claim as new, and desire to secure by Letters Patent, is—

The arrangement of section B, with its perforated or bottomless cup C and ribs $a$, or their equivalents, and section A, with its flange D and ribs $b$, or their equivalents; both of said sections having suitable handles, and hinged together in either of the modes herein described, and operating substantially as and for the purposes set forth.

In testimony that we claim the foregoing, we have hereunto set our hands and seals this 27th day of November, 1866.

ARTHUR CLARKE,
THOMAS REECE.

Witnesses:
EMILE B. G. BADGER,
E. R. BADGER.